April 4, 1950 W. LEATHERS ET AL 2,502,967
CIRCUIT MAKING AND BREAKING MECHANISM
Filed Dec. 29, 1945 2 Sheets-Sheet 1
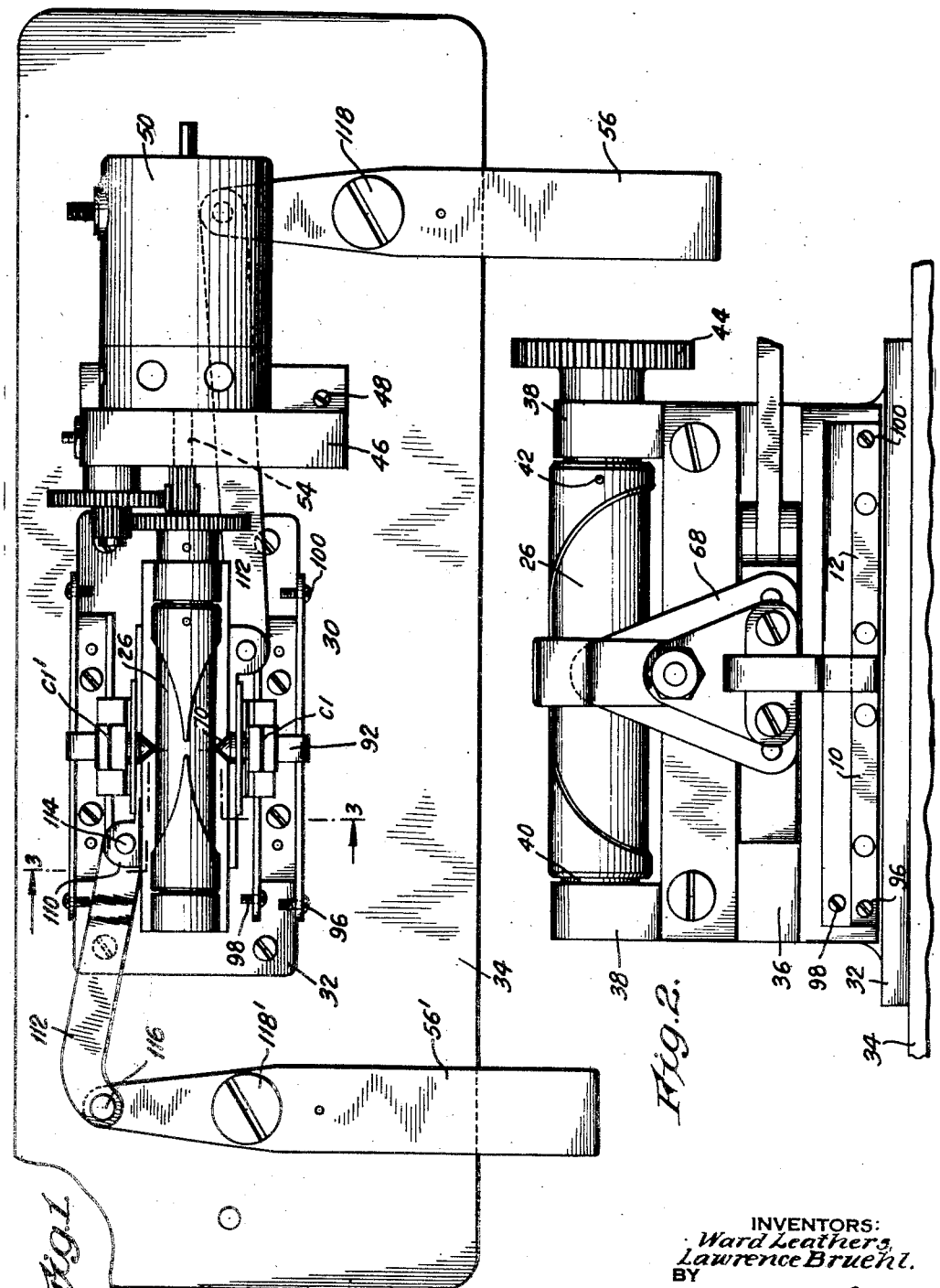
INVENTORS:
Ward Leathers,
Lawrence Bruehl.
BY
W. M. Wilson
ATTORNEY April 4, 1950     W. LEATHERS ET AL     2,502,967
CIRCUIT MAKING AND BREAKING MECHANISM
Filed Dec. 29, 1945     2 Sheets-Sheet 2

INVENTORS:
Ward Leathers,
Lawrence Bruehl.
BY
W. M. Wilms
ATTORNEY

Patented Apr. 4, 1950

2,502,967

UNITED STATES PATENT OFFICE

2,502,967

CIRCUIT MAKING AND BREAKING MECHANISM

Ward Leathers, Brooklyn, and Lawrence Bruehl, New York, N. Y., assignors to International Business Machines Corporation, New York, N. Y., a corporation of New York Application December 29, 1945, Serial No. 638,398

1 Claim. (Cl. 200—27)

The improved circuit making and breaking mechanism comprising the present invention is primarily adapted for use in connection with gun stabilization mechanism of the type shown in a co-pending application of Ward Leathers et al., Serial No. 638,394, filed December 29, 1945, for Stabilized gun control mechanism, of which the present application is a continuation-in-part.

While the circuit making and breaking mechanism comprising the present invention is primarily adapted for use in connection with gun stabilizing mechanism, as outlined above, it will be understood that the same may have numerous other applications in controlling the effective speed or speeds of operation of one or more electrically driven motors. Furthermore, the circuit making and breaking mechanism is not necessarily limited to controlling electrical motor circuits and the same may, if desired, with or without modification, be employed for selectively energizing or deenergizing any electrical circuit or any number of circuits for varying lengths of time during each cam cycle or for operating upon one or more pairs of electrical contacts to open and close the same, regardless of the nature to which these electrical circuits or contacts may be put.

The provision of a circuit making and breaking apparatus of the character briefly outlined above being the principal object of the invention, other objects and advantages thereof will become apparent as the nature of the invention is better understood.

In the accompanying two sheets of drawings forming a part of this specification:

Fig. 1 is a top plan view of the improved circuit maker and breaker mechanism.

Fig. 2 is a side elevational view thereof.

Figure 3:
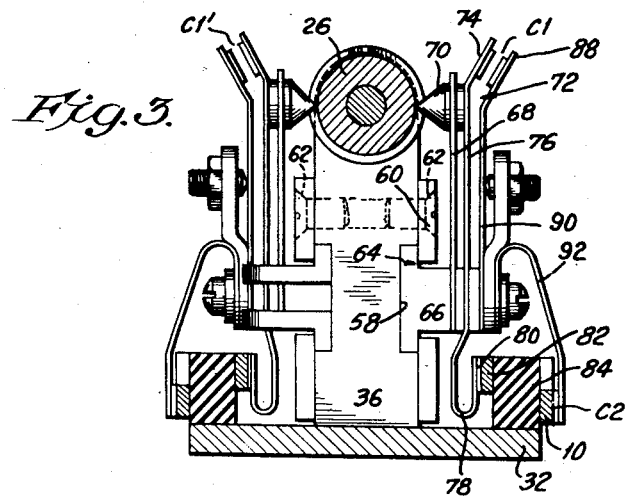
Fig. 3 is a sectional view taken substantially along the line 3—3 of Fig. 1.

The circuit making and breaking mechanism shown in detail in Figs. 1 and 2 is employed for the purpose of selectively applying current impulses to the motors Mt and Me at regular cyclic intervals and for varying periods or increments of time ranging from no impulses whatsoever, i. e. impulses of zero duration, to the continuous application of direct current to the motors, i. e. impulses of infinite duration. Controls which make this possible for each motor are entirely independent of each other but are in common dependent upon the provision of a rotary cam, the structure and nature of which will be made clear presently.

The motors Mt and Me are substantially identical in construction and each is preferably in the form of a reversible direct current motor having a ground connection and field winding connections represented by the wires $a$ and $b$. The reversible circuit for the motor Mt leads from the ground $g$, battery B, through wire $c$, resistance R1, coil or pigtail lead wire $d$, a pair of cooperating contacts C1, a slidable contact C2, and one or the other of a pair of contact bars 10 or 12, as the case may be, leading to the wires $a$ and $b$ respectively and from thence through the motor windings to ground $g$. The contacts C1 and C2 are suitably carried upon a sliding member 14 which is movable in opposite directions in such a manner that the contact C2 may engage one or the other of the contact bars 10 or 12. When the member 14 is in its neutral or center position, the contact C2 rests upon an insulation strip 16 which separates the bars 10 and 12 so that no current may flow through the motor.

With either of the circuits above described in effect, it will be seen that on account of the resistance R1, which is preferably of a low ohmic value in the neighborhood of ten ohms, somewhat less than the full rated voltage of the battery B is applied to the motor for rotation thereof in either direction when the contact C2 is solely in engagement with either of the contact bars 10 or 12. Means are provided, however, that when the member 14 is moved to either of its extreme positions a branch circuit is established, the net effect of which is to place an additional resistance R2 in the circuit in parallel with the resistance R1, so that the value of voltage applied to the motor may more nearly approach the full rated voltage of the battery. This latter feature is accomplished by the provision of a pair of contact bars 18 and 20 which are positioned adjacent the ends of the contact bars 10 and 12 respectively and are separated therefrom by insulation pieces 22 and 24. It will be seen that when the member 14 is moved to one extreme position, the sliding contact C2 will bridge the contact bars 10 and 18, thus allowing current to flow through an additional path leading from ground $g$ through battery B, wire $h$, resistance R2, wires $i$, $e$, contact bar 18, contact C2, contact bar 10 and wire $a$ to the motor. The contact bars 18 and 20 are connected in common by a wire $f$, and thus a similar circuit prevails when the member 14 is moved to its other extreme position.

The contacts C1 are designed for cooperation with a rotary cam member 26, the nature of which will be made clear presently. For the present, it is deemed sufficient to state that this member is generally of elongated cylindrical design and the surface thereof is so constructed that when the contacts C1 assume their neutral or center position they will remain at all times open despite the rotation of the cam member 26. As the contacts C1 are shifted away from their neutral position toward either end of the cam member 26, means are provided whereby the contacts C1 are caused to become closed intermittently for correspondingly longer and longer periods of time until such time as these contacts assume one or the other of their extreme positions, at which time the contacts C1 will remain permanently closed, thus supplying a steady direct current flow to the motor at the highest possible voltage attainable from the battery B through the resistance R1 and R2 in parallel. During all other times until the contacts reach either of these extreme positions, the intermittent current impulses applied to the motor will be at somewhat lesser voltage since only the resistance R1 will exist in the motor circuit.

The electrical arrangement described above constitutes the circuit control for the motor Mt by means of which, in the gun stabilizing mechanism of the above mentioned co-pending application, stabilization of the turret in azimuth is effected. A similar circuit arrangement exists for the motor Me by means of which the gun is stabilized in elevation. It is deemed unnecessary to enter into detailed description of the circuit arrangement for the motor Me, it being sufficient to apply similar and corresponding reference characters to the various circuit parts and elements. A pair of cut-out contacts C3 and C4 are disposed in the circuit of the motor Me and are adapted to become open when the gun reaches either limit of its elevational movements. The manner in which these contacts operate has been disclosed in the above mentioned application and it is deemed sufficient to state herein that one of these contacts will become open when the gun is elevated at an angle of approximately 30° and that the other contact becomes open when the gun is lowered from the horizontal at an angle of approximately 10°.

The cam member 26 is adapted to be driven through a gear reduction device 28 from a motor M which is designed to operate at a continuous rate of speed and by means of which the cam member 26 is caused to perform one cycle in approximately one-thirtieth of a second, although it is obvious that various other lengths of time may be selected for the cam cycle. The arrangement of parts thus far described has been concerned primarily with the control of the effective speed of rotation of the traverse motor Mt. A similar set of instrumentalities is provided and is associated with the cam member 26 for controlling the effective speed of rotation of the motor Me. This mechanism is substantially a duplication of the previously described mechanism and the circuits involved are substantially identical.

Referring now to Figs. 1, 2 and 3, the circuit making and breaking apparatus per se is designated in its entirety at 30 and is mounted upon a base plate 32. The base plate 32 is centrally carried upon a second base plate 34, this latter plate being provided for the purpose of supporting various motor drive, gear reduction and control handle mechanisms for actuating the circuit making and breaking mechanism 30.

Extending longitudinally of the base plate 32 and projecting upwardly therefrom and substantially coextensive therewith is a block member 36. The ends of the block 36 are formed with upwardly projecting rounded ears 38 which serve to rotatably support therein the opposite ends of a shaft 40 on which there is pinned as at 42 the previously mentioned cam member 26. One end of the shaft 40 projects outwardly beyond the confines of the ears 38 and carries thereon a gear 44 which forms one element of the gear reduction device 28. The gear reduction device 28 is suitably supported on a standard 46 which is secured as at 48 to the base plate 34 and which projects upwardly therefrom. The casing 50 of the motor M is bolted or otherwise secured to the standard 46 and is provided with a driving shaft 54 which projects through an opening in the standard 46 and thus operatively communicates with the gear reduction device 28 for driving purposes.

The contacts C1, which control the movements of the motor Mt, are associated with one specific set of contact instrumentalities existing on one side of the block 36 and which operate under the control of a handle 56. The contacts C1' are associated with an identical set of contact instrumentalities operating under the control of a similar handle 56'. Since these two sets of contact instrumentalities are identical in construction, a description of one of them will suffice for the other and, accordingly, the set of instrumentalities associated with the contacts C1, which control the movements of the traverse stabilizing motor Mt, will be described and similar reference characters will be applied to the corresponding parts of the other set of instrumentalities.

The block member 36 is provided with a slot 58 in each side thereof and a pair of elongated strips of material 60 are fastened by means of countersunk studs 62 to each side of the block and have their edges overlying the slots 58, thus forming on opposite sides of the block a pair of guideways 64. Slidably supported in the guideway 64 is a slide member 66 of a thickness slightly greater than the depth of the slot 58 and which, as a consequence, projects outwardly from this slot. The outer surface of the slide member 66 has secured thereto an upstanding spring member 68. The member 68 is generally of triangular configuration and carries at its upper end a cam finger 70 designed for cooperation with the surface of the cam 26. The slide member 66 also has mounted thereon a contact assembly 72 including the pair of contacts C1. One element 74 of the pair of contacts C1 is mounted on a contact strip 76, the lower end of which is turned outwardly as at 78 and provides a sliding contact element 80 designed for cooperation with a contact bar 82 mounted on an elongated insulation bar 84 suitably secured to the base plate 32. The other element 88 of the contacts C1 is mounted on a contact strip 90, the lower end of which is in electrical engagement with a wiper arm 92 carrying the sliding contact element C2 designed for selective engagement with the pair of contact bars 10 and 12 or for engagement with the insulation strip 16. The contact bars 82, 10 and 12 are provided with respective binding posts 96, 98 and 100.

Figure 4:
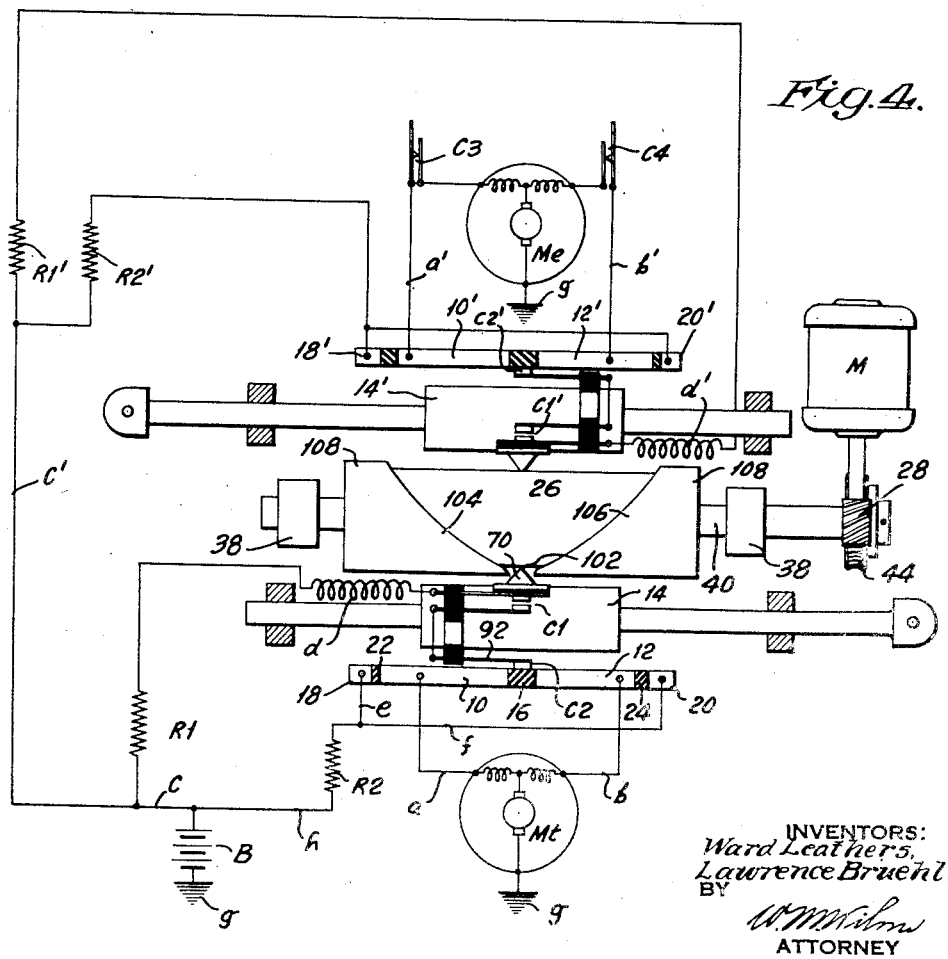
Fig. 4 is an electrical circuit diagram showing the electrical connections for the circuit maker and breaker mechanism when employed in connection with gun stabilizing mechanism.

It is to be noted that whereas in Figs. 1, 2 and 3 the contact element 74 of the pair of contacts C1 makes electrical contact with its binding post 96 through the contact strip 76 and contact bar 82, in Fig. 4 this contact element 74 has associated therewith the flexible coil or pigtail lead wire d. The two structures are equivalent electrically and for simplicity's sake the simpler form has been employed in the circuit diagram.

The rotary cam member 26 is of elongated, generally cylindrical design and is truly cylindrical in its exact medial regions throughout a limit band or extent designated at 102. The cam member 26 is provided with opposed raised portions 104 and 106 which are symmetrical and which taper from substantially a point in the vicinity of the medial regions 102 outwardly toward the opposite ends of the member and finally terminate in cylindrical portions 108 at the ends of the member.

From the above description it will be seen that when the slide member 66 is in its center position with the cam finger 70 bearing against the cylindrical portion 102 of the cam member 26, no transverse motion of the cam finger 70 will obtain during rotation of the cam member and, as a consequence, the contact elements 74 and 88 of the pair of contacts C1 will remain electrically apart. In addition to this, the wiper arm 92 will be so positioned that the sliding contact C2 rests upon the insulation strip 16 so that no circuit through the contacts C1 is made possible. As the slide member 66 is moved in one direction or the other away from its medial position, the cam finger 70 will move into the path of movement of one or the other of the raised cam portions 104 or 106, as the case may be. In the initial stages of displacement each time one or the other of the raised cam surfaces 104 or 106 engages the cam finger 70, a momentary closing of very brief duration of the contacts C1 will result. As the slide member 66 becomes further displaced from its medial position, the duration of closing of the contacts C1 will become correspondingly increased, although the time of closing in the cam cycle will not be altered. As the slide member 66 approaches either limit at one or the other end of the cam member 26, the duration of closing of the contacts C1 will be comparatively long for each cycle. Finally, when the slide member 66 attains one or the other of its extreme positions, the cam finger 70 will ride onto one or the other of the cylindrical portions 108 of the cam 26 and the contacts C1 will then remain continuously closed.

In order to move the slide member 66 in one direction or the other, the same is formed with a pair of attachment ears 110 adjacent one end thereof between which there extends one end of a link 112, the ears and link being suitably pinned together as at 114. The free or outer end of the link 112 is pivoted as at 116 to one end of the control handle 56, this latter handle being pivoted as at 118 to the base plate 34. It will be seen that as the handle 56 is swung to the right or to the left, as viewed in Fig. 1, the slide member 66 will be moved in the opposite direction to vary the duration of closing movements of the contacts C1, as well as to vary the direction of current flow through the motor Mt.

It is also to be noted that the two sets of instrumentalities which operate under the control of the handles 56 and 56' operate entirely independently of each other, one serving to control the motion of the motor Mt and the other serving to control the motion of the motor Me.

While there have been shown and described and pointed out the fundamental novel features of the invention as applied to a preferred embodiment, it will be understood that various omissions and substitutions and changes in the form and details of the apparatus illustrated and in its operation may be made by those skilled in the art without departing from the spirit of the invention. It is the intention, therefore, to be limited only as indicated by the scope of the following claim.

What is claimed is:

Circuit making and breaking apparatus of the character described comprising in combination a supporting block, a pair of supporting members projecting upwardly from said block, an elongated, rotary, generally cylindrical cam member rotatably disposed between and supported by said supporting members, means for rotating said cylindrical cam member about its longitudinal axis at a constant rate of speed, a pair of guideways formed in the opposite side of said block, a slide member disposed in each guideway and movable therein axially of the cam member, a pair of contact arms mounted on said slide member and projecting upwardly therefrom, a pair of normally open cooperating contacts carried by said arms, a contact finger mounted on one of said arms and at all times yieldingly engaging the surface of said cam member in any position of adjustment of the slide member, a stationary contact bar substantially coextensive with the cam member, a wiper arm bearing against said bar and electrically connected to one of said contact arms, an additional pair of contact bars arranged in alignment, an insulated medium separating all of said contact bars from each other, a second wiper arm electrically connected to the other contact and designed for selectively engaging either of said latter pair of contact bars upon shifting of the slide member, a pair of cam projections formed on the surface of said cam member and controlling the opening and closing movements of said contacts, said cam projections in the vicinity of the end regions of the cam member being continuous and extending completely around the surface of the cam member and progressively decreasing in extent inwardly of the cam member and thus tapering to a point in the vicinity of the regions of the cam member, said cam finger normally occupying a position intermediate said cam projections, and said last mentioned wiper arm occupying a position intermediate said pair of contact bars when the slide member is in its central position, and means for shifting said slide member axially of the cam member.

WARD LEATHERS.
LAWRENCE BRUEHL.

REFERENCES CITED

The following references are of record in the file of this patent:

UNITED STATES PATENTS

| Number | Name | Date |
| --- | --- | --- |
| 1,461,001 | Hartford | July 3, 1923 |
| 1,971,313 | Johnson | Aug. 21, 1934 |
| 2,109,776 | Johnson | Mar. 1, 1938 |